(12) United States Patent
Seo

(10) Patent No.: US 10,693,164 B2
(45) Date of Patent: Jun. 23, 2020

(54) FUEL CELL VEHICLE

(71) Applicant: Toyota Jidosha Kabushiki Kaisha, Toyota-shi, Aichi-ken (JP)

(72) Inventor: Yusuke Seo, Kasugai (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/234,823

(22) Filed: Dec. 28, 2018

(65) Prior Publication Data

US 2019/0221872 A1 Jul. 18, 2019

(30) Foreign Application Priority Data

Jan. 12, 2018 (JP) ................................. 2018-003666

(51) Int. Cl.
| | | |
|---|---|---|
| *H01M 8/04828* | (2016.01) | |
| *H02P 4/00* | (2006.01) | |
| *H01M 8/04303* | (2016.01) | |
| *H01M 16/00* | (2006.01) | |
| *H01M 8/04537* | (2016.01) | |
| *H01M 8/04858* | (2016.01) | |

(Continued)

(52) U.S. Cl.
CPC ......... *H01M 8/04947* (2013.01); *B60L 50/40* (2019.02); *B60L 50/70* (2019.02); *B60L 50/75* (2019.02); *B60L 58/10* (2019.02); *B60L 58/30* (2019.02); *H01M 8/04303* (2016.02); *H01M 8/04552* (2013.01); *H01M 8/04559* (2013.01); *H01M 8/04932* (2013.01); *H01M 8/04955* (2013.01); *H01M 16/00* (2013.01); *H01M 16/006* (2013.01); *H02P 4/00* (2013.01); *H02P 27/08* (2013.01); *B60L 2210/40* (2013.01); *B60L 2240/547* (2013.01); *B60Y 2200/91* (2013.01); *B60Y 2400/112* (2013.01); *B60Y 2400/202* (2013.01); *B60Y 2400/61* (2013.01); *H01M 2250/20* (2013.01); *H01M 2250/402* (2013.01); *H02J 7/345* (2013.01); *H02P 2201/09* (2013.01)

(58) Field of Classification Search
CPC .................................. H02P 4/00; H02P 27/08
USPC .................................................. 318/500, 494
See application file for complete search history.

(56) References Cited

U.S. PATENT DOCUMENTS

| | | | | |
|---|---|---|---|---|
| 7,413,042 B2 * | 8/2008 | Saitou | ...................... | B60L 58/10 180/65.285 |
| 7,835,831 B2 * | 11/2010 | Chung | .................... | B60L 58/34 701/22 |
| 7,996,124 B2 * | 8/2011 | Kwon | .................... | B60W 10/28 701/22 |

FOREIGN PATENT DOCUMENTS

JP 2011-090823 A 5/2011

* cited by examiner

*Primary Examiner* — David Luo
(74) *Attorney, Agent, or Firm* — Dinsmore & Shohl LLP

(57) ABSTRACT

A fuel cell vehicle may include: an electric traction motor; an inverter; a fuel cell system; a first boost converter including first low voltage terminals connected to a fuel cell and first high voltage terminals connected to the inverter, the first boost converter including a first capacitor connected between positive and negative terminals of the first high voltage terminals; a first relay connected between the first boost converter and the inverter; and a controller, wherein the controller is configured to: shut down the fuel cell system; while a voltage of the fuel cell is higher than a voltage threshold, discharge the first capacitor and maintain a voltage thereof higher than the voltage of the fuel cell; and when the voltage of the fuel cell becomes lower than the voltage threshold, stop discharging the first capacitor and (Continued)

disconnect the first boost converter from the inverter by opening the first relay.

3 Claims, 5 Drawing Sheets

(51) Int. Cl.
    *B60L 50/75*     (2019.01)
    *B60L 50/40*     (2019.01)
    *B60L 50/70*     (2019.01)
    *B60L 58/30*     (2019.01)
    *B60L 58/10*     (2019.01)
    *H02P 27/08*     (2006.01)
    *H01M 8/04955*     (2016.01)
    *H02J 7/34*     (2006.01)

FUEL CELL VEHICLE

CROSS-REFERENCE TO RELATED APPLICATION

This application claims priority to Japanese Patent Application No. 2018-003666 filed on Jan. 12, 2018, the contents of which are hereby incorporated by reference into the present application.

TECHNICAL FIELD

The teaching disclosed herein relates to a fuel cell vehicle provided with a boost converter which boosts an output voltage of a fuel cell.

BACKGROUND

Japanese Patent Application Publication No. 2011-90823 (Patent Literature 1) describes fuel cells vehicle provided with a boost converter which boosts an output voltage of a fuel cell. Low voltage terminals of the boost converter are connected to the fuel cells, and high voltage terminals thereof are connected to an inverter. The inverter converts boosted DC power to AC power suitable for driving an electric traction motor. In general, the boost converter has a current smoothing capacitor connected between a positive terminal and a negative terminal of the high voltage terminals. When the fuel cells are stopped, the capacitor retains a voltage higher than the output voltage of the fuel cells. The fuel cells also retain a corresponding voltage for a while after having stopped.

In the fuel cell vehicle of Patent Literature 1, when a main switch of the vehicle is turned off, the fuel cells and the capacitor are discharged according to the following procedure. Firstly, an oxygen supplier is stopped but a pump is not stopped, and a fuel supply is continued for a while. This fuel supply enables electricity generation to continue until remaining oxygen is consumed. In the fuel cell vehicle of Patent Literature 1, the pump is stopped after the remaining oxygen has been consumed. Next, the boost converter is activated, and remaining charges in the fuel cells are discharged to a high voltage side of the boost converter. The boost converter is stopped after the remaining charges in the fuel cells have been discharged. Then, the inverter is operated to discharge the capacitor through the inverter.

SUMMARY

In the fuel cell vehicle of Patent Literature 1, the electricity are forcibly discharged from the fuel cells by operating the boost converter. Such forced discharge of the electricity may cause deterioration of catalyst and the like of the fuel cells. The fuel cell vehicle which discharges the capacitor of the boost converter and the fuel cells upon stopping power can be improved regarding this aspect.

A fuel cell vehicle disclosed herein comprises an electric traction motor, an inverter, a fuel cell system, a first boost converter, a first relay, and a controller. The inverter is configured to convert DC power to AC power for driving the electric traction motor. The fuel cell system may include a fuel cell, an air compressor, and a fuel cell pump. The fuel cell generates electricity by supplies of hydrogen fuel and oxygen. The first boost converter includes first low voltage terminals connected to the fuel cell and first high voltage terminals connected to the inverter. A first capacitor is connected between a positive terminal and a negative terminal of the first high voltage terminals. The first relay is connected between the first boost converter and the inverter. The controller stops power according to a following sequence. The controller firstly shuts down the fuel cell system. Then, while a voltage of the fuel cell is higher than a predetermined voltage threshold, the controller discharges the first capacitor with a voltage of the first capacitor maintained to be higher than the voltage of the fuel cell. When the voltage of the fuel cell becomes lower than the predetermined voltage threshold, the controller stops the discharging of the first capacitor and disconnects the first boost converter from the inverter by opening the first relay.

In the aforementioned stop sequence, the fuel cell system is shut down prior to the discharging of the first capacitor. Due to this, the voltage of the fuel cell naturally and gradually decreases. In the fuel cell vehicle disclosed herein, the controller discharges the first capacitor such that the voltage of the first capacitor is maintained to be higher than the voltage of the fuel cell. The first capacitor is discharged as the voltage of the fuel cell decreases. Since charges are not forcibly discharged from the fuel cell, damages to catalyst and the like may be suppressed.

Details and further improvements of the technique disclosed herein will be described in the following detailed description.

DETAILED DESCRIPTION

Figure 1:
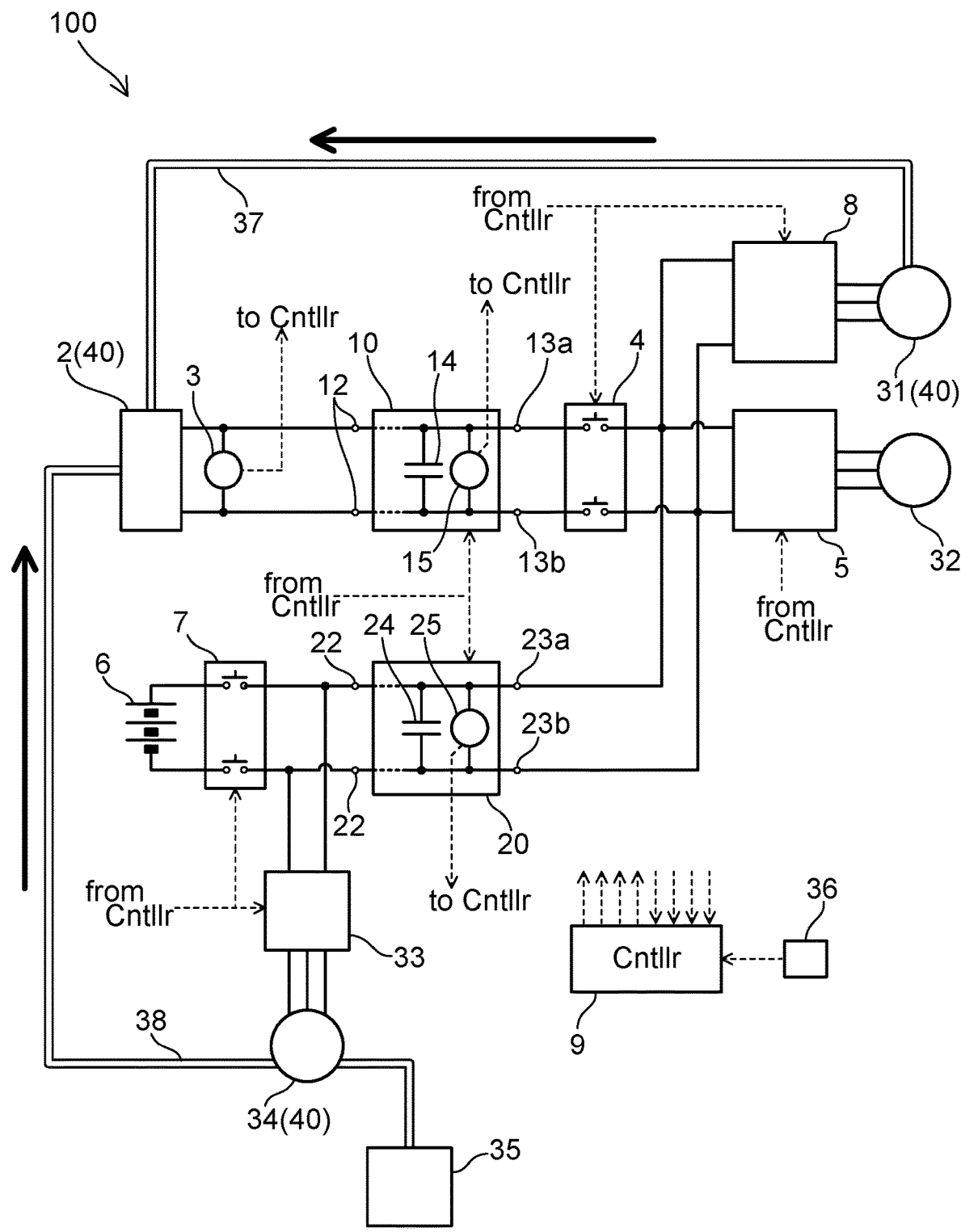
FIG. 1 shows a block diagram of a power system of a fuel cell vehicle.

Representative, non-limiting examples of the present disclosure will now be described in further detail with reference to the attached drawings. This detailed description is merely intended to teach a person of skill in the art further details for practicing aspects of the present teachings and is not intended to limit the scope of the disclosure. Furthermore, each of the additional features and teachings disclosed below may be utilized separately or in conjunction with other features and teachings to provide improved fuel cell vehicle.

Moreover, combinations of features and steps disclosed in the following detailed description may not be necessary to practice the disclosure in the broadest sense, and are instead taught merely to particularly describe representative examples of the disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Some features of a fuel cell vehicle disclosed herein will be described. A configuration of a fuel cell vehicle of an embodiment is especially effective in a fuel cell vehicle in which a relay for electrically disconnecting a fuel cell and an inverter is arranged between a first boost converter and the inverter, not between the fuel cell and the first boost converter. The aforementioned fuel cell vehicle may avoid damaging the fuel cell upon discharging a capacitor in the first boost converter connected to the fuel cell.

A controller may discharge the capacitor, for example, by driving the inverter and allowing current to flow in a electric traction motor. Alternatively, in a case of being provided with a discharge resistance, the controller may discharge the capacitor by using the discharge resistance. A voltage threshold is set to a value at a degree by which no severe damage will be caused in peripheral components even when a current leak occurs. The voltage threshold may be, for example, 42 volts.

The fuel cell vehicle disclosed herein may further include a battery, a second boost converter, and a second relay. The second boost converter includes second low voltage terminals connected to the battery and second high voltage terminals connected to the inverter. The second relay is connected between the battery and the second boost converter. A second capacitor is connected between a positive terminal and a negative terminal of the second high voltage terminals. In a fuel cell vehicle as above, it is desirable to discharge the second capacitor as well. The controller may execute a following procedure in addition to the aforementioned stop sequence. The controller disconnects the battery from the second boost converter by opening the second relay prior to discharging the second capacitor. After having stopped the fuel cell, while a voltage of the fuel cell is higher than a predetermined voltage threshold, the controller discharges the first and second capacitors with voltages of the first and second capacitors maintained to be higher than the voltage of the fuel cell. When the voltage of the fuel cell becomes lower than the voltage threshold, the controller stops the discharging of the first capacitor and disconnects the inverter from the first boost converter by opening the first relay. As a final step, the controller discharges the second capacitor. The controller may discharge the first and second capacitors by using the inverter and the electric traction motor, or the discharge resistance.

The controller may execute a following sequence. In a case where the voltage of the fuel cell is lower than the voltage threshold prior to starting discharging of the first capacitor, the controller may discharge the first capacitor such that the first capacitor has a voltage equal to the voltage threshold and open the first relay. In a case where the voltage of the fuel cell is higher than the voltage threshold before starting the discharge, the first and second capacitors may be drastically discharged to the voltage threshold at once to complete the discharge within a short period of time.

EMBODIMENT

A fuel cell vehicle 100 of an embodiment will be described with reference to the drawings. FIG. 1 shows a block diagram of a power system of the fuel cell vehicle 100. Broken arrow lines in the drawing indicate signal lines. A reference sign 37 shows an air pipe, and a reference sign 38 shows a fuel pipe. A hold arrow line depicted along the air pipe 37 shows a flow of air (oxygen), and a bold arrow line depicted along the fuel pipe 38 shows a flow of fuel gas.

The fuel cell vehicle 100 includes a fuel cell 2, a battery 6, a first boost converter 10, a second boost converter 20, a first relay 4, a second relay 7, a first inverter 5, and an electric traction motor 32. The electric traction motor 32 may be referred to as the traction motor 32 or the motor 32 for short.

An output voltage of the fuel cell 2 is, for example, 0 to 200 volts, and an output voltage of the battery 6 is, for example, 300 volts. On the other hand, a drive voltage of the traction motor 32 is, for example, 300 to 600 volts. There are cases where the drive voltage is higher than the output voltages of the fuel cell 2 and the battery 6. Due to this, the fuel cell vehicle 100 is provided with the first boost converter 10 and the second boost converter 20. Low voltage terminals 12 of the first boost converter 10 are connected to the fuel cell 2, and high voltage terminals 13 thereof are connected to the first inverter 5. The first relay 4 is connected between the first boost converter 10 and the first inverter 5. Low voltage terminals 22 of the second boost converter 20 are connected to the battery 6, and high voltage terminals 23 thereof are connected to the first inverter 5. The second relay 7 is connected between the second boost converter 20 and the battery 6.

Figure 2:
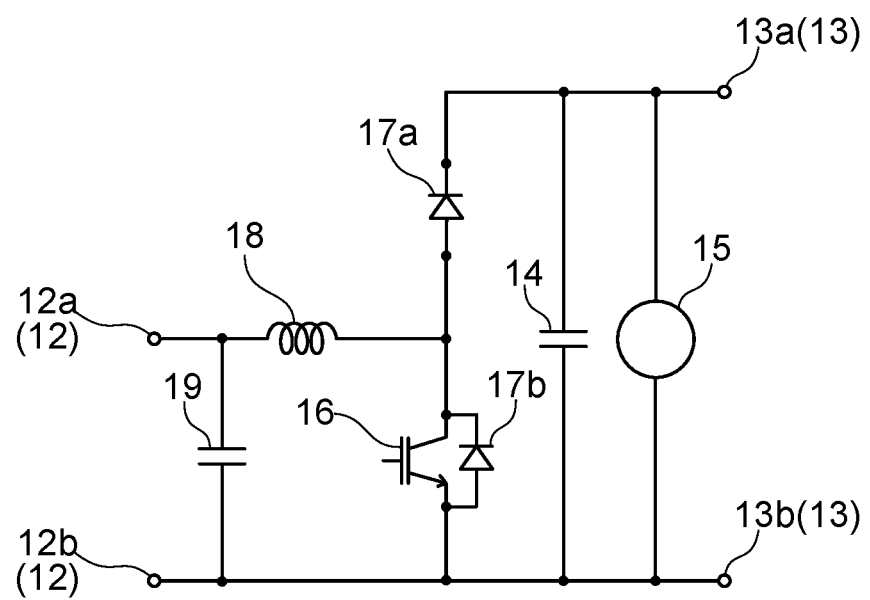
FIG. 2 is a circuit diagram of a first boost converter.

Although a circuit configuration of the first boost converter 10 will be described later with reference to FIG. 2, a capacitor 14 and a voltage sensor 15 are connected between a positive terminal 13a and a negative terminal 13b of the high voltage terminals of the first boost converter 10. Although a circuit configuration of the second boost converter 20 will be described later with reference to FIG. 3, a capacitor 24 and a voltage sensor 25 are connected between a positive terminal 23a and a negative terminal 23b of the high voltage terminals of the second boost converter 20.

The voltage sensor 15 is configured to measure a voltage between the positive terminal 13a and the negative terminal 13b of the high voltage terminals of the first boost converter 10. The voltage between the positive terminal 13a and the negative terminal 13b is equal to a voltage between both ends of the capacitor 14. The voltage sensor 25 is configured to measure a voltage between the positive terminal 23a and the negative terminal 23b of the high voltage terminals of the second boost converter 20. The voltage between the positive terminal 23a and the negative terminal 23b is equal to a voltage between both ends of the capacitor 24. Other than the voltage sensors 15, 25, the fuel cell vehicle 100 is further provided with a voltage sensor 3 configured to measure the output voltage of the fuel cell 2. Measurement data of the voltage sensors 3, 15, 25 is sent to an controller 9.

As aforementioned, the broken arrow lines in FIG. 1 show the signal lines. A letter string "to Cntllr" represents "to Controller" (to the controller 9), meaning that the signal line for sending a signal (data) to the controller 9 is connected to the controller 9. A letter string "from Cntllr" represents "from Controller" (from the controller 9), meaning that the signal line for the controller 9 to send a signal is connected to the controller 9. Other than the ones shown in the drawing, the fuel cell vehicle 100 is further provided with various signal lines and devices, however, depiction thereof is omitted.

The first inverter 5 is configured to convert boosted DC power to AC power suitable for driving the motor 32. The first boost converter 10, the second boost converter 20, and the first inverter 5 are controlled by the controller 9. The controller 9 determines a target output of the motor 32 from a vehicle speed and an output voltage of an accelerator opening. The target output includes a target voltage and a target frequency. The controller 9 determines output ratios of the first boost converter 10 and the second boost converter 20 from output current and the output voltage of the fuel cell 2. The controller 9 controls the first and second boost converters 10, 20 such that the target voltage and the output ratios of the first and second boost converters 10, 20 are realized, and controls the first inverter 5 such that the target frequency is realized.

A second inverter 8 is connected also to the high voltage terminals 13 of the first boost converter 10 and the high voltage terminals 23 of the second boost converter 20. The second inverter 8 is configured to drive an air compressor 31. Further, a third inverter 33 is connected between the second relay 7 and the second boost converter 20. The third inverter 33 is configured to drive a fuel pump 34.

A fuel cell system 40 includes the fuel cell 2, the air compressor 31, and the fuel pump 34. The air compressor 31 is configured to supply air (oxygen) to the fuel cell 2 through the air pipe 37. The air compressor 31 is an oxygen supplier configured to supply the oxygen to the fuel cell 2. The fuel pump 34 is configured to supply hydrogen fuel in a fuel tank 35 to the fuel cell 2 through the fuel pipe 38. The second inverter 8 and the third inverter 33 are also controlled by the controller 9. In other words, the controller 9 is configured to further control the air compressor 3 and the fuel pump 34.

The first relay 4 is a switch configured to connect and disconnect the inverters 5, 8 and the first boost converter 10 (and the fuel cell 2), and the second relay 7 is a switch configured to connect and disconnect the battery 6 and the second boost converter 20. When a main switch 36 of the vehicle is turned on, the controller 9 closes the first relay 4 to connect the fuel cell 2 and the first boost converter 10 to the inverters 5, 8, and closes the second relay 7 to connect the battery 6 to the second boost converter 20. When the controller 9 closes the second relay 7, the fuel cell vehicle 100 is enabled to travel by using the battery 6. When the controller 9 closes the first relay 4 and the second relay 7 and activates the fuel cell system 40, the fuel cell vehicle 100 enters a state in which traveling by using both the battery 6 and the fuel cell 2 is enabled.

On the other hand, when the main switch 36 of the vehicle is switched to, off, the controller 9 stops the fuel cell 2, opens the first relay 4 to disconnect the inverters 5, 8 from the first boost converter 10 (and the fuel cell 2), and opens the second relay 7 to disconnect the second boost converter 20 from the battery 6. A power stop process by the controller 9 will be described later.

A circuit configuration of the first boost converter 10 will be described with reference to FIG. 2. FIG. 2 is a circuit diagram of the first boost converter 10. The first boost converter 10 includes a transistor 16, diodes 17a, 17b, a reactor 18, capacitors 14, 19, and the voltage sensor 15. One end of the reactor 18 is connected to a positive terminal 12a of the low voltage terminals 12 of the first boost converter 10. Other end of the reactor 18 is connected to an anode of the diode 17a. A cathode of the diode 17a is connected to the positive terminal 13a of the high voltage terminals 13. A collector of the transistor 16 is connected to a connection node between the reactor 18 and the diode 17a. An emitter of the transistor 16 is connected to a negative terminal 12b of the low voltage terminals 12. The negative terminal 121) of the low voltage terminals 12 is directly connected to the negative terminal 13b of the high voltage terminals 13. The diode 17b is connected in inverse parallel to the transistor 16. The capacitor 14 and the voltage sensor 15 are connected between the positive terminal 13a and the negative terminal 13b of the high voltage terminals 13, as aforementioned. The capacitor 19 is connected between the positive terminal 12a and the negative terminal 12b of the low voltage terminals 12.

The transistor 16 is controlled by the controller 9 (see FIG. 1). When the transistor 16 repeats to be turned on and off at a predetermined duty ratio, a voltage applied to the low voltage terminals 12 is boosted and the boosted voltage is outputted from the high voltage terminals 13. The first boost converter 10 of the circuit of FIG. 2 is a chopper-type voltage converter, and as such, its output voltage pulsates. The capacitor 14 connected between the positive terminal 13a and the negative terminal 13b of the high voltage terminals 13 is provided to suppress pulsation of the output voltage of the first boost converter 10. The capacitor 14 has a large capacity, and a large quantity of electric energy may be stored therein. Since the diode 17a is connected between the positive terminal 12a of the low voltage terminals 12 and the positive terminal 13a of the high voltage terminals 13, current does not flow from the high voltage terminals 13 to the low voltage terminals 12. In some embodiments, as the capacitor 14 does not need to retain a high voltage during when the fuel cell vehicle 100 is not used, the capacitor 14 needs to be discharged upon stopping the power supply.

Figure 3:
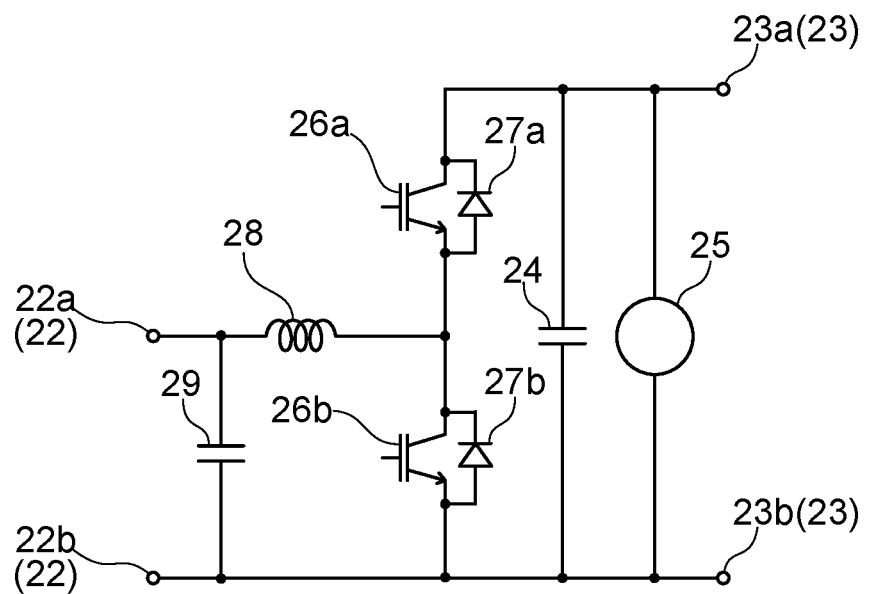
FIG. 3 is a circuit diagram of a second boost converter.

A circuit configuration of the second boost converter 20 will be described with reference to FIG. 3. FIG. 3 is a circuit diagram of the second boost converter 20. The second boost converter 20 includes transistors 26a, 26b, diodes 27a, 27b, a reactor 28, capacitors 24, 29, and the voltage sensor 25. The two transistors 26a, 26b are connected in series between the positive terminal 23a and the negative terminal 23b of the high voltage terminals 23. The reactor 28 is connected between a midpoint of the series connection of the two transistors 26a, 26b and a positive terminal 22a of the low voltage terminals 22. The capacitor 29 is connected between the positive terminal 22a and a negative terminal 22b of the low voltage terminals 22. The negative terminal 22b of the low voltage terminals 22 is directly connected to the negative terminal 23b of the high voltage terminals 23. The diode 27a is connected in inverse parallel to the transistor 26a, and the diode 27b is connected in inverse parallel to the transistor 26b. The capacitor 24 and the voltage sensor 25 are connected between the positive terminal 23a and the negative terminal 23b of the high voltage terminals 23 as aforementioned.

The second boost converter 20 shown in FIG. 3 has both a boost function to boost a voltage applied to the low voltage terminals 22 and output the boosted voltage to the high voltage terminals 23 and a step-down function to step down a voltage applied to the high voltage terminals 23 and output the stepped-down voltage to the low voltage terminals 22. The second boost converter 20 is a so-called bidirectional DC-DC convertor. Since the boost function is emphasized in the disclosure herein, the circuit of FIG. 3 is termed the second boost converser 20.

The transistors 26a, 26b are controlled by the controller 9 (see FIG. 1). When the transistor 26b repeats to be turned on and off at a predetermined duty ratio, the voltage applied to the low voltage terminals 22 is boosted and the boosted voltage is outputted from the high voltage terminals 23. When the transistor 26a repeats to be turned on and off at a predetermined duty ratio, the voltage applied to the high voltage terminals 23 is stepped down and the stepped-down voltage is outputted from the low voltage terminals 22. When the transistor 26a and the transistor 26b repeat to be turned on and off with complementary PWM signals, the boost function and the step-back function switch automatically according to a balance between the voltage of the low voltage terminals 22 and the voltage of the high voltage terminals 23. The traction motor 32 frequently switches between a mode of outputting drive torque by using electric power and a mode of generating regenerative power by using deceleration energy of the vehicle. The aforementioned functions of the second boost converter 20 are suitable for controlling the traction motor in which the modes of power consumption and power generation frequently switch.

The second boost converter 20 of the circuit of FIG. 3 is also a chopper-type voltage converter, and as such, its output voltage pulsates. The capacitor 24 connected between the positive terminal 23a and the negative terminal 23b of the high voltage terminals 23 is provided to suppress the pulsation of the output voltage of the second boost converter 20. The capacitor 24 has a large capacity, and a large quantity of electric energy may be stored therein. Since the diode 27a is connected between the positive terminal 22a of the low voltage terminals 22 and the positive terminal 23a of the high voltage terminals 23, current does not flow from the high voltage terminals 23 to the low voltage terminals 22 while the transistor 26a is off. In some embodiments, as the capacitor 24 does not retain a high voltage during when the fuel cell vehicle 100 is not used, the capacitor 24 needs to be discharged upon stopping the power supply.

As aforementioned, upon stopping the power supply in the fuel cell vehicle 100, the high voltages are retained in the capacitor 14 of the first boost converter 10 and the capacitor 24 of the second boost converter 20, and as such, the capacitors 14, 24 need to be discharged. Especially, since a cutoff switch is not interposed between the first boost converter 10 and the fuel cell 2, the capacitor 14 of the first boost converter 10, which is in constant connection with the fuel cell 2, needs to be discharged. The capacitor 19 of the first boost converter 10 also needs to be discharged, however, since the capacitor 19 will be discharged when the capacitor 14 is discharged, so the discharge of the capacitor 14 will be emphasized herein. The same applies to the capacitor 29 of the second boost converter 20.

Figure 4:
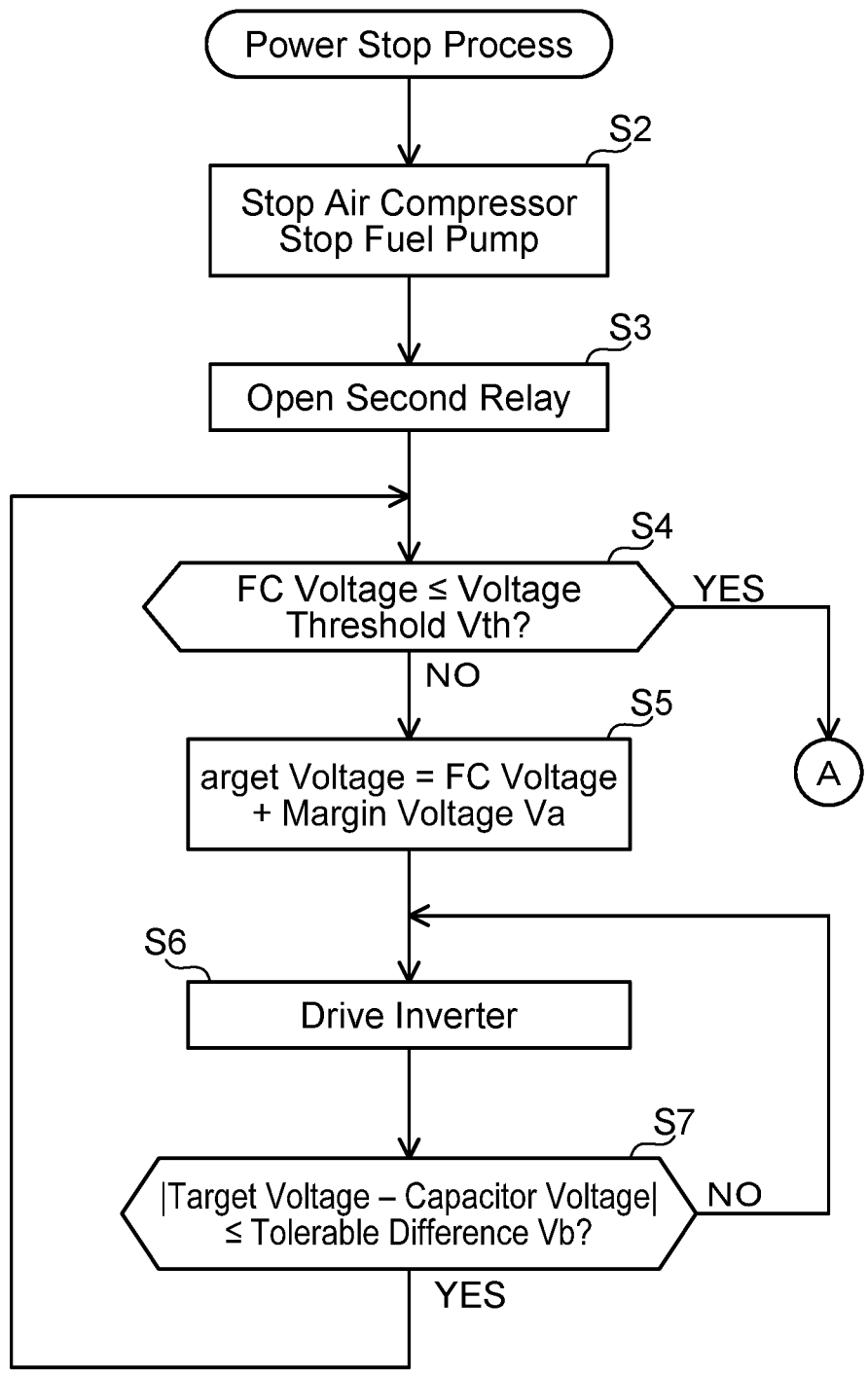
FIG. 4 is a flowchart of a power stop process.
Figure 5:
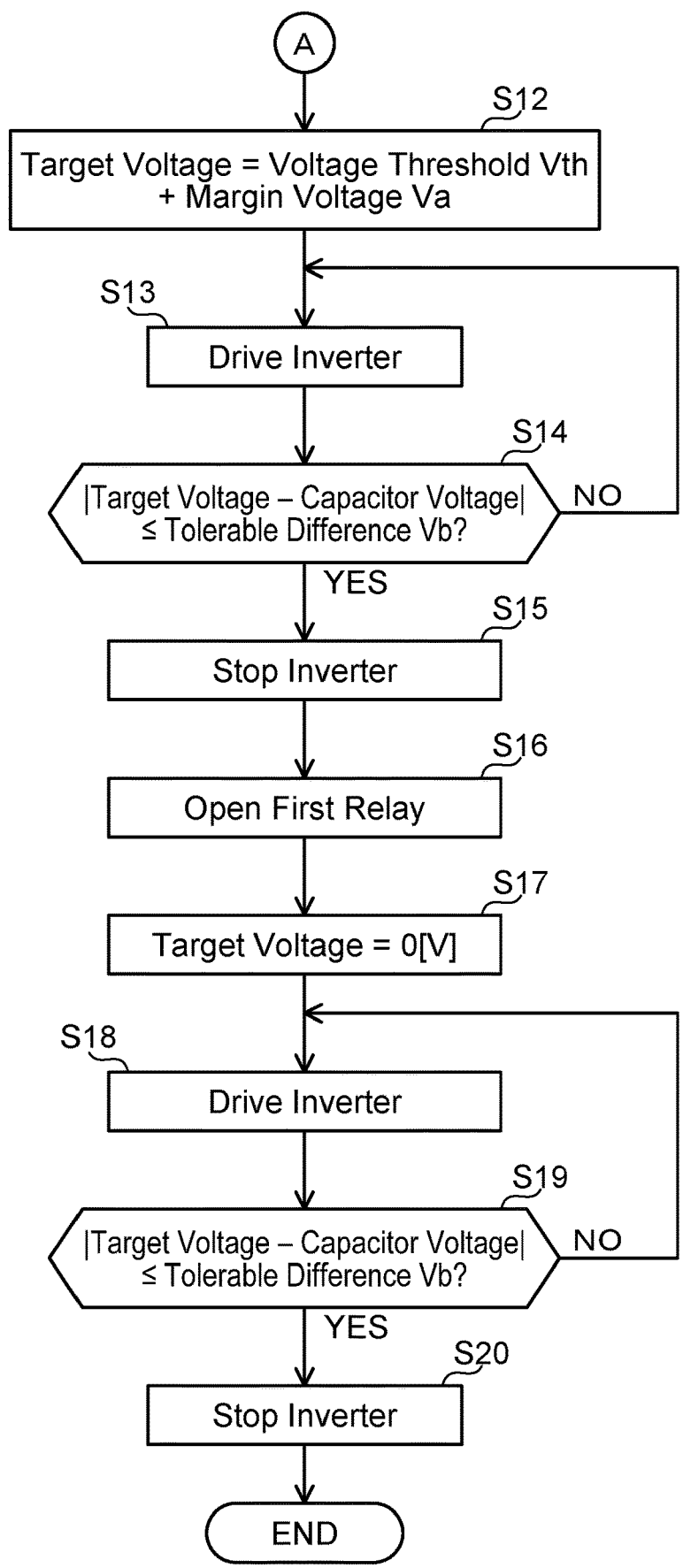
FIG. 5 is a flowchart of the power stop process (continued from FIG. 4).

FIGS. 4 and 5 show flowcharts of the power stop process. Processes of FIGS. 4 and 5 are executed by the controller 9. The controller 9 includes a memory storing programs, and a CPU configured to execute the stored programs. The controller 9 loads programs corresponding to the processes of FIGS. 4 and 5 from the memory and executes the same. The processes of FIGS. 4 and 5 are initiated when the main switch 36 of the vehicle (see FIG. 1) is turned off.

Figure 6:
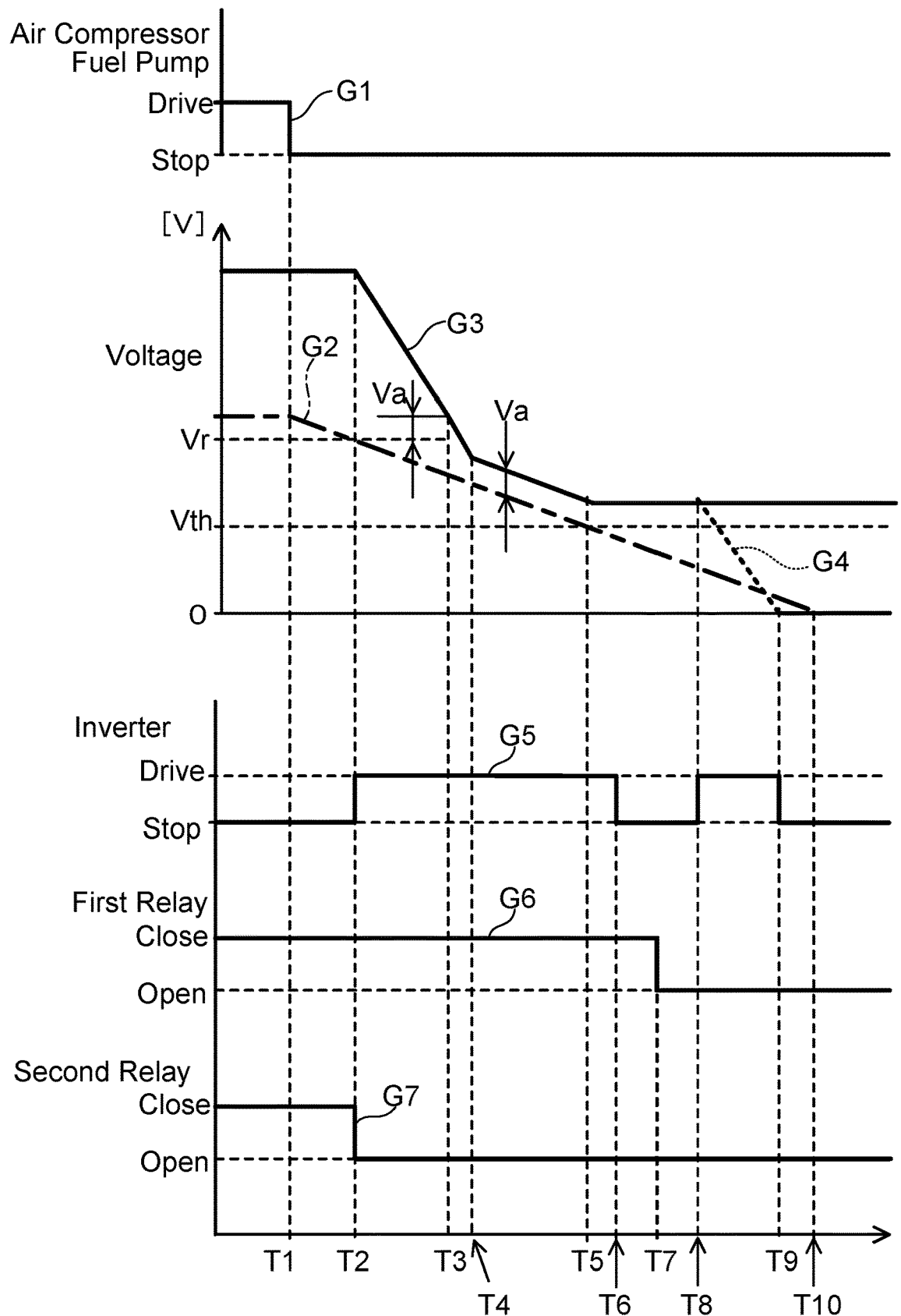
FIG. 6 is a time chart of the power stop process.

FIG. 6 shows a time chart of the power stop process. A graph G1 is a time chart indicating drive/stop of the air compressor 31 and the fuel pump 34. A graph G2 shows a chronological change in the voltage of the fuel cell 2. A graph G3 shows the voltage of the capacitor 14 of the first boost converter 10. A graph G4 shows the voltage of the capacitor 24 of the second boost converter 20. Until time T8, the voltage of the capacitor 24 is equal to the voltage of the capacitor 14. A graph G5 is a time chart indicating drive/stop of the first inverter 5. A graph G6 is a time chart indicating open/close of the first relay 4. A graph G7 is a time chart indicating open/close of the second relay 7. The stop process will be described with reference to FIGS. 4 and 5 as well as FIG. 6.

Hereinbelow, for the sake of simplicity of explanation, the voltage of the fuel cell 2 will be termed an FC voltage, and the voltages of the capacitors 14, 24 will be termed capacitor voltages.

When the main switch 36 is turned off, the controller 9 firstly stops the air compressor 31 and stops the fuel pump 34 (step S2). Since the supplies of fuel and oxygen are stopped, the fuel cell 2 stops. At this occasion, the controller 9 also executes other process(es) necessary for stopping the fuel cell 2. In the time chart of FIG. 6, the main switch 36 is switched to off at time T1, and the controller 9 stops the air compressor 31 and the fuel pump 34. In other words, the controller 9 stops the fuel cell 2 at time T1. Since the fuel cell 2 has been stopped, the voltage of the fuel cell 2 (the FC voltage) gradually drops from time T1 (the graph G2).

Next, the controller 9 opens the second relay 7 to disconnect the second boost converter 20 from the battery 6 (step S3). At time T2, the second relay 7 is opened and the battery 6 is disconnected from the second boost converter 20.

Next, the controller 9 drives the first inverter 5 to flow charges of the capacitors 14, 24 to the motor 32 to discharge the capacitors 14, 24. Hereinbelow, this discharging process will be described in detail.

At time T2, the first inverter 5 is activated (the graph G5). At this occasion, the controller 9 controls current to flow in coils of the motor 32 such that the motor 32 does not rotate. Since the fuel cell 2 is stopped and the battery 6 is disconnected, the power of the capacitors 14, 24 flows to the motor 32. That is, the capacitors 14, 24 are discharged. In discharging the capacitors 14, 24, the controller 9 sets a target discharging voltage of the capacitors 14, 24 such that the voltages of the capacitors 14, 24 are maintained to be higher than the voltage of the fuel cell 2. Since the fuel cell 2 and the first boost converter 10 are electrically connected, if the target discharging voltage of the capacitors 14, 24 becomes lower than the voltage of the fuel cell 2, current flows from the fuel cell 2 to the motor 32. The controller 9 determines the target discharging voltage such that the current does not flow out from the fuel cell 2.

In the discharging process, the controller 9 firstly compares the voltage of the fuel cell 2 (the FC voltage) with a predetermined voltage threshold Vth (step S4). The voltage threshold Vth is set to a value that is low enough not to impose serious adverse effect to surrounding components even when a current leak occurs. The voltage threshold Vth is, for example, 42 volts. In a case where the FC voltage is higher than the voltage threshold Vth, the controller 9 sets the target discharging voltage of the capacitors 14, 24 to the FC voltage+a margin voltage Va (step S5). The margin voltage Va is set to absorb measurement errors of the voltage sensor. That is, for example, even in a case where the voltage of the fuel cell 2 (the FC voltage) measured by the voltage sensor 3 is lower than the actual FC voltage by 5 volts, if the margin voltage Va is set to 10 volts, the target discharging voltage does not become lower than the actual FC voltage. The margin voltage Va is, for example, 10 to 20 volts. In a case where the measurement value of the voltage sensor is accurate, the margin voltage Va may be zero.

In the time chart of FIG. 6, for example, the FC voltage at time T2 is a voltage Vr. The target voltage at time T2 becomes the FC voltage Vr+the margin voltage Va.

Next, the controller 9 drives the first inverter 5 and discharges the capacitors 14, 24 until the capacitor voltages drop to the target voltage (steps S6, S7). From time T2 and thereafter, the controller 9 drives the first inverter 5 until the capacitor voltages reach the target voltage Vr+Va and discharges the capacitors 14, 24.

In step S7, the controller 9 compares a voltage difference between, the target voltage and the capacitor voltages with a tolerable difference Vb. The controller 9 continues to drive the inverter until the voltage difference becomes smaller than the tolerable difference Vb (step S7: NO, S6). In other words, the controller 9 discharges the capacitors 14, 24 until the capacitor voltages match the target voltage within a range of the tolerable difference Vb.

When the voltage difference becomes smaller than the tolerable difference Vb, the controller 9 compares the voltage of the fuel cell 2 (the FC voltage) with the voltage threshold Vth again (step S7: YES, S4). As aforementioned, since the fuel cell 2 has been stopped, the FC voltage drops gradually. In a case where the FC voltage is higher than the voltage threshold Vth in step S4, the controller 9 resets the target voltage with a new FC voltage (step S5). Then, similar to the previous step, the controller 9 drives the inverter 5 until the difference between the capacitor voltages and the target voltage becomes smaller than the tolerable difference Vb (steps S6, S7). With a loop from step S4 to step S7, the capacitors 14, 24 are gradually discharged without allowing their voltages to become lower than the voltage of the fuel cell 2.

In the time chart of FIG. 6, at time T3, the capacitor voltages (the graph G3) drop to an initial target voltage (that is, Vr+Va). After this, the loop from step S4 to step S7 is repeated. As a result, from time T4 and thereafter, the capacitor voltages drop by following the FC voltage while maintaining their states to be higher than the FC voltage by the margin voltage Va (the graph (G3).

The capacitor 19 of the first boost converter 10 is discharged as the voltage of the fuel cell 2 drops. The capacitor 29 of the second boost converter 20 is discharged together with the capacitor 24.

In the process of step S4, when the voltage of the fuel cell 2 (the FC voltage) becomes lower than the voltage threshold Vth, the process proceeds to a process of step S12 of FIG. 5. In step S12, the controller 9 sets the target voltage of the capacitors to the voltage threshold Vth+the margin voltage Va. Then, the controller 9 drives the inverter 5 and continues the discharge until the voltage difference between the target voltage and the capacitor voltages becomes smaller than the tolerable difference Vb (steps S13, S14). Processes of steps S12 to S14 are countermeasures for a case where a voltage drop of the fuel cell 2 progresses quickly and the FC voltage is already lower than the voltage threshold Vth when the process of step S4 is executed for a first time. When step S4 is executed for the first time, the voltages of the capacitors 14, 24 are equal to the voltage of the fuel cell 2 that was boosted by the first boost converter 10. Due to this, in the case where the FC voltage is already lower than the voltage threshold Vth when the process of step S4 is executed for the first time, the capacitors 14, 24 are discharged immediately to the voltage threshold Vth by the processes of steps S12 to S14. Due to the processes of steps S12 to S14, a discharge time for the case where the FC voltage is already lower than the voltage threshold Vth when the process of step S4 is executed for the first time can be shortened.

On the other hand, in a case where the process of step S12 is executed after the loop from step S4 to step S7 has been executed at least once, the capacitor voltages may be already close to the voltage threshold Vth in some cases. In such cases, a branching determination of step S14 immediately becomes YES, and the process of the controller 9 proceeds to step S15. When the determination of YES is made in step S14, the capacitor voltages are already down to the voltage threshold Vth by which no serious adverse effect will be imposed on the surrounding components even when a current leak occurs.

In the time chart of FIG. 6, at time T5, the FC voltage becomes lower than the voltage threshold Vth. From time T5 and thereafter, the capacitor voltages are retained at the target voltage (the voltage threshold Vth+the margin voltage Va).

Next, the controller 9 stops the inverter 5 (step S15). That is, the controller 9 stops discharging. Then, the controller 9 opens the first relay 4 to disconnect the first boost converter 10 and the fuel cell 2 from the inverter 5 (step S16). In the time chart of FIG. 6, the inverter 5 is stopped at time T6, and the first relay 4 is opened at time T7.

Next, the controller 9 sets the target discharging voltage of the capacitor 24 to 0 volts, and drives the inverter 5 again (steps S17, S18). The capacitors 24, 29 of the second boost converter 20 are discharged by processes of steps S18, S19. The controller 9 stops the inverter 5 when a voltage difference between the target voltage (=0) and the capacitor voltage becomes smaller than the tolerable difference Vb (step S19: YES, S20). The power stop process is thereby completed. In the time chart of FIG. 6, the inverter 5 is driven again at time T8, and the voltage of the capacitor 24 thereby drops (the graph G4). The voltage of the capacitor 24 reaches 0 volts at time T9. On the other hand, the FC voltage gradually drops, and reaches 0 volts at time T10.

The aforementioned power stop process has the following advantages. That is, in the aforementioned power stop process, the air compressor 31 that supplies the oxygen to the fuel cell 2 and the fuel pump 34 that supplies the fuel to the fuel cell 2 are immediately stopped when the main switch 36 is switched to off. As such, a pump noise stops immediately after the main switch 36 is switched to off. Further, in the aforementioned power stop process, the capacitors 14, 24 are discharged while their voltages are maintained to be higher than the FC voltage. Thus, charges are not forcibly moved from the fuel cell 2 to the capacitors 14, 24 during discharging of the capacitors 14, 24. When the charges are forcibly discharged from the fuel cell 2, a catalyst and the like of the fuel cell 2 may be damaged. In the power step process of the embodiment, such a risk can be avoided. The capacitor 19 is discharged with the capacitor 14, and the capacitor 29 is discharged with the capacitor 24.

What is claimed is:

1. A fuel cell vehicle comprising:
an electric traction motor;
an inverter configured to convert DC power to AC power for driving the electric traction motor;
a fuel cell system including a fuel cell configured to generate the DC power with hydrogen fuel and oxygen;
a first boost converter including first low voltage terminals connected to the fuel cell and first high voltage terminals connected to the inverter, the first boost converter including a first capacitor connected between a positive terminal and a negative terminal of the first high voltage terminals;
a first relay connected between the first boost converter and the inverter; and
a controller,
wherein the controller is configured to:
shut down the fuel cell system;
while a voltage of the fuel cell is higher than a predetermined voltage threshold, discharge the first capacitor with a voltage of the first capacitor maintained to be higher than the voltage of the fuel cell; and
when the voltage of the fuel cell becomes lower than the predetermined voltage threshold, stop the discharging of the first capacitor and disconnect the first boost converter from the inverter by opening the first relay.

2. The fuel cell vehicle of claim 1 further comprising:
a battery;
a second boost converter including second low voltage terminals connected to the battery and second high voltage terminals connected to the inverter, the second boost converter including a second capacitor connected between a positive terminal and a negative terminal of the second high voltage terminals; and
a second relay connected between the battery and the second boost converter,
wherein the controller is configured to:
   disconnect the battery from the second boost converter by opening the second relay prior to discharging the second capacitor;
   while the voltage of the fuel cell is higher than the predetermined voltage threshold, discharge the first and second capacitors with voltages of the first and second capacitors maintained to be higher than the voltage of the fuel cell;
   when the voltage of the fuel cell becomes lower than the predetermined voltage threshold, stop the discharging of the first capacitor and disconnect the first boost converter from the inverter by opening the first relay; and
   discharge the second capacitor.

3. The fuel cell vehicle of claim 1, wherein in a case where the voltage of the fuel cell is lower than the predetermined voltage threshold prior to starting the discharging of the first capacitor, the controller is configured to discharge the first capacitor such that the first capacitor has a voltage equal to the predetermined voltage threshold and open the first relay.

* * * * *

UNITED STATES PATENT AND TRADEMARK OFFICE
CERTIFICATE OF CORRECTION

PATENT NO. : 10,693,164 B2
APPLICATION NO. : 16/234823
DATED : June 23, 2020
INVENTOR(S) : Yusuke Seo It is certified that error appears in the above-identified patent and that said Letters Patent is hereby corrected as shown below:

On the Title Page

Item (72), delete "Kasugai" and insert --Kasugai-shi Aichi-ken--, therefor.

In the Specification

In Column 3, Line(s) 67, delete "hold" and insert --bold--, therefor.

In Column 5, Line(s) 62, delete "121)" and insert --12b--, therefor.

In Column 8, Line(s) 45, delete "(step S5" and insert --(step S5)--, therefor.

In Column 8, Line(s) 65, after "between", delete ","

In Column 10, Line(s) 37, delete "step" and insert --stop--, therefor.

Signed and Sealed this
First Day of September, 2020

Andrei Iancu
*Director of the United States Patent and Trademark Office*